(12) United States Patent
Nishida et al.

(10) Patent No.: US 7,007,920 B2
(45) Date of Patent: Mar. 7, 2006

(54) METHOD OF CONTROLLING ENERGIZATION OF ELECTRO-MAGNETICALLY DRIVEN VALVE WITH VARIABLE FEEDBACK GAIN

(75) Inventors: Hideyuki Nishida, Suntou-gun (JP);
Isao Matsumoto, Susono (JP);
Kazuhiko Shiratani, Susono (JP);
Shoji Katsumata, Gotenba (JP);
Tametoshi Mizuta, Susono (JP); Keiji Yoeda, Numazu (JP); Makoto Ogiso, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 119 days.

(21) Appl. No.: 10/491,098

(22) PCT Filed: Oct. 3, 2002

(86) PCT No.: PCT/JP02/10331

§ 371 (c)(1),
(2), (4) Date: Mar. 29, 2004

(87) PCT Pub. No.: WO03/031785

PCT Pub. Date: Apr. 17, 2003

(65) Prior Publication Data

US 2004/0244740 A1    Dec. 9, 2004

(30) Foreign Application Priority Data

Oct. 4, 2001    (JP)    ............................. 2001-308524

(51) Int. Cl.
*F16K 31/02*    (2006.01)
(52) U.S. Cl. ................. 251/129.04; 123/90.11
(58) Field of Classification Search ........... 251/129.04, 251/129.16; 123/90.11
See application file for complete search history.

(56) References Cited

U.S. PATENT DOCUMENTS

| | | | | |
|---|---|---|---|---|
| 3,699,989 | A * | 10/1972 | O'Connor et al. ..... | 251/129.04 |
| 6,234,122 | B1 * | 5/2001 | Kirschbaum et al. .... | 123/90.11 |
| 6,286,532 | B1 * | 9/2001 | van Nieuwstadt et al. ..................... | 251/129.04 |
| 6,390,039 | B1 * | 5/2002 | Fuwa ....................... | 123/90.11 |
| 6,427,971 | B1 * | 8/2002 | Kawabe et al. ......... | 251/129.04 |
| 2001/0002586 | A1 | 6/2001 | Taniguchi et al. | |

FOREIGN PATENT DOCUMENTS

JP    U 62-160709    10/1987

(Continued)

*Primary Examiner*—John Bastianelli
(74) *Attorney, Agent, or Firm*—Oliff & Berridge, PLC

(57) ABSTRACT

A control method with variable feedback gain for energization of an electro-magnetically driven intake/exhaust valve of an internal combustion engine increases opening and closing speeds of the intake/exhaust valve driven with electromagnets having small capacity and brings the final speed of the opening and closing action of the valve close to zero. A target moving speed of the armature relative to the electromagnets is determined dependent upon a spacing distance of the armature from the electromagnet; at least a part of energization of the electro-magnetically driven valve is controlled through feedforward control so as to make an actual moving speed of the armature relative to the electromagnets in conformity with the target moving speed while at least the other part of the energization is controlled through feedback control based upon a deviation of the actual moving speed from the target moving speed.

13 Claims, 7 Drawing Sheets

FOREIGN PATENT DOCUMENTS

| | | |
|---|---|---|
| JP | A 1-203636 | 8/1989 |
| JP | A 7-332136 | 12/1995 |
| JP | A 11-036905 | 2/1999 |
| JP | A 11-210916 | 8/1999 |
| JP | A 2000-130123 | 5/2000 |
| JP | A 2000-234534 | 8/2000 |
| JP | A 2000-337177 | 12/2000 |
| JP | A 2001-159332 | 6/2001 |
| JP | A 2001-221094 | 8/2001 |
| JP | A 2001-221360 | 8/2001 |
| JP | A 2001-81569 | 3/2002 |
| JP | A 2002-81329 | 3/2002 |

* cited by examiner

METHOD OF CONTROLLING ENERGIZATION OF ELECTRO-MAGNETICALLY DRIVEN VALVE WITH VARIABLE FEEDBACK GAIN

BACKGROUND OF INVENTION

1. Technical Fields

This invention relates to methods of controlling energization of an electro-magnetically driven valve such as an intake valve and an exhaust valve in an internal combustion engine.

2. Prior Art

With the recent development of computer control technologies, in the field of internal combustion engines, especially for a vehicle, an electro-magnetic actuator has been employed for opening and closing an intake valve and/or an exhaust valve, instead of a conventional cam on a cam shaft driven synchronously with a crank shaft, and, based upon the increase of the degree of freedom of the timing of the opening and closing operations of the valves through use of the electromagnetic actuator, there have been proposed various manners of controlling the operation of an internal combustion engine. Examples of such operation controls are described in Japanese Patent Laid-Open publications Nos. 11-210916, 2000-73800, 2000-234534, 2000-337177, 2001-182570, 2001-193504, 2002-81329, 2002-81569.

FIG. 1 in the accompanied drawings shows a general and schematic sectional view of an electro-magnetically driven intake valve, which is similarly shown in FIG. 2 of the Japanese Publication No. 2001-193504 based upon an application filed by the same applicant as the present application. In this drawing, an opening end of an inlet port 26 is fringed with a valve seat(s) 200 and opened and closed by a valve body 28a. The valve body 28a is carried by a valve shaft 28b, and in this figure, a valve guide 201 guides the valve shaft 28b so that the valve shaft can move up and down, and thereby, the valve body 28a is moved between opened and closed positions by electromagnetic driving apparatus generally denoted by 30.

The electromagnetic driving apparatus 30 has a housing 300, within which incorporated are a valve-closing electromagnetic apparatus consisting of valve-closing cores 301 and valve-closing coils 303; a valve-opening electromagnetic apparatus consisting of valve-opening cores 302 and valve-opening coils 304; an armature 305 carried on the valve shaft 28b and movable between the valve-closing and valve-opening electromagnetic apparatuses; and compression coil springs 306 and 307. As shown in the drawing, the compression coil springs 306 and 307 bring the armature 305 to an intermediate position between the two electromagnetic apparatuses when neither of coils 303, 304 is energized.

In the example as shown here, an intake valve lift sensor 40 is mounted directly on the electromagnetic driving apparatus 30. This lift sensor has a housing 400, mounted on the housing 300 of the electromagnetic driving apparatus 30; a disk-like target 401, mounted on the upper end of the valve shaft 28b within the housing 400; and a gap sensor 402 attached on the housing 400, while facing on the target 401, and detecting the displacement of the target.

Further, although not shown in the drawing, in such an electro-magnetically driven valve used as intake and/or exhaust valves, in general, a slip joint is incorporated near the lower end of the valve shaft 28b, namely the coupling portion with the valve body 28a, which slip joint enables the distance between the valve body and armature to expand and contract very slightly. This slip joint is provided for avoiding a condition that, if the armature is fixedly connected to the valve body, the support of the armature flush against the valve-closing cores 301 and coils 303 would prevent the tight sealing of the valve body to the valve seat, when the valve body is forced on the valve seat by the pressure within a cylinder during compression and explosion strokes.

The control of operation of opening and closing this type of electro-magnetically driven valves is done by controlling energization of valve-opening and/or valve-closing coils. In this case, generally, the operational states of an electro-magnetically driven valve, used for either of an intake valve or an exhaust valve, are either of an open state or a close state, and any states in between are transient unless any special control of opening and closing a valve is done. Thus, usually, an electro-magnetically driven valve, when operated, is held in either of a full opened position, in which an armature is adhered to an valve-opening electromagnet consisting of valve-opening coils and cores, or a full closed position, in which the armature is adhered to an valve-closing electromagnet consisting of valve-closing coils and cores, by feeding a weak holding current to the valve-opening or valve-closing coils except during opening or closing the valve. When the valve body is moved from the full closed position to the full opened position, the holding current for the valve-closing coils is turned off first (usually, a reverse current is subsequently fed to the valve-closing coils), and then, under the action of springs, the valve body and armature start moving to the valve-opening side in unison. Thereafter, when the armature reaches to a position near an intermediate point between the valve-opening and valve-closing electromagnets and the distance between the armature and valve-opening electromagnet is shorten enough for the valve-opening electromagnet to function effectively through energization of the valve-opening coils, the energization of the valve-opening coil is started. Similarly, the valve is moved from the full opened position to the full closed position.

In general, when a valve body is started to move from a full closed position to a full opened position or from the full opened position to the full closed position, its moving speed increases gradually together with its displacement (Usually, as an armature moves closer to an electromagnet, its electromagnetic force attracting the armature increases.). Preferably, however, the moving speeds of the valve body and armature is to be reduced to almost zero by the end of the opening or closing operation of the valve, for avoiding violent collision of the armature against the coils and cores of the valve-opening and/or closing electromagnets at the end of the opening or closing operation of the valve body; and violent collision of the valve body against a valve seat in closing the valve. On the other hand, in order to complete the opening and closing operation of the valve quickly, preferably, the moving speeds of the valve body and armature are to be increased in the intermediate portion of the opening and closing movement of the valve.

From the above, it is generally recognized that the moving speed of a valve body or an armature is preferably to be varied with the displacement of the valve body or armature as shown in FIG. 2. In FIG. 2, an example of speed change in opening a valve is shown, wherein the abscissa is the displacement of a valve body or armature, namely Lift (the distance between the valve body and valve seat) and the ordinate is an opening speed, namely, the moving speed of the armature or valve body during opening. For varying the moving speed with lift as shown in FIG. 2, exciting current to be fed to coils (valve-opening coils in this case) is made varied with the position of the valve body or armature along a profile as shown in FIG. 3.

In this connection, mathematically speaking, the concepts defined as "distance", "movement" and "speed" each have positive and negative values, and in matters of the opening and closing of a valve as in the present application, the distance, movement and speed are regarded as positive or negative, depending upon the direction of the movement of a valve body; but, since the present objects are to consider how opening and/or closing operations of a valve body are made quick and how the movement of the valve is terminated at the end of the operation without impact, the displacement of the valve body or armature, represented with lift as shown above, and the moving speed of the valve body or armature in the direction of increasing the displacement are defined as positive.

Furthermore, in order to obtain the relation between the displacement and moving speed of a valve body or an armature as shown in FIG. 2, exciting current fed to coils is controlled in connection with the displacement through combination of a feedforward(FF) control and a feedback (FB) control. In this case, first, the exciting current is controlled with the FF control for setting an actual moving speed for a target moving speed as shown in FIG. 2 (the profile in FIG. 3). A deviation of an actual moving speed from the target, when generated, is (expectedly) cancelled by correcting the exciting current through the FB control based upon the value of the deviation. Usually, based upon a deviation of an actual moving speed V from a target moving speed Vt, $\Delta V$ ($=V-Vt$), an amount of FB control for exciting current is given by $-Gb \cdot \Delta V$, where Gb is a positive FB control gain. Thus, when $\Delta V$ is positive, namely, when the actual moving speed exceeds the target moving speed, the control of the exciting current is done by subtracting $Gb \cdot \Delta V$ from the corresponding FF control amount. In one case, an FB control gain Gb is constant, and in other cases as described in the above JP No. 2000-23454, an FB control gain is increased as the distance of spacing between an armature and an electromagnet attracting the armature (spacing distance) increases. In JP No. 2002-81329, it is proposed to define fields in accordance with the ranges of deviation $\Delta V$ and spacing distance and to execute a feedback control using a different FB control gain for each of the fields.

By the way, since an FB control amount is given by $-Gb \cdot \Delta V$ as described above, it can be understood that, the larger the FB control gain is, the higher responsibility or sensitivity of the control, namely, the higher control speed is obtained, thereby increasing the effect of the FB control. The increase of the control speed, however, often causes an excessive control inducing hunting in the control. On the other hand, if an FB control gain is excessively small, the longer time would be required for making an actual moving speed in conformity with a target moving speed, or the moving speed at the end of the movement would not reach to the target moving speed that would be an appropriate value.

Further, in the speed control of the opening and closing operation of an electro-magnetically driven valve: the controlled object of the present invention, the importance and/or necessity of FB control varies, dependent upon the relation between actual and target moving speeds, such as the direction and magnitude of the deviation between the actual and target moving speeds. As already described, in order to prevent violent collision between a valve seat or an electromagnet and a valve body or an armature resting thereon (at the end of an opening or closing operation), a target moving speed is so set that the speed at the resting becomes substantially zero. For example, however, in a case that an actual moving speed exceeds its target value, it is enough that the speed at the resting is within a certain satisfactory range and there is little need to urgently correct the actual moving speed through FB control (it is possible that the reduction in the time for opening and closing a valve is preferable.). On the other hand, when an actual moving speed is lower than its target one, it is possible that the moving speed has become zero before an armature reaches to electromagnets. In this case, the armature will be pulled back by springs, and thereby, the armature and a valve body are floating around the intermediate position between opened and closed positions, inducing a very serious problem of stepping-out of operation of an intake valve or an exhaust valve. In order to avoid such a stepping-out condition, it is required that an actual moving speed can be corrected quickly through FB control without inducing the control hunting.

Accordingly, in the control of opening and closing speed of an electro-magnetically driven valve, an FB control gain should be set taking into account the necessity of FB control based upon the relation between actual and target moving speeds so as to avoid the control hunting and stepping-out condition.

Further, it is possible that a target moving speed or an FF control amount (current fed to electromagnets If given in accordance with the profile in FIG. 3) does not match characteristics of an actual electro-magnetically driven valve due to aging variation of the valve or an individual difference of products, and thereby, the magnitude (absolute value) of an FB control amount would be enlarged. In other words, while a target moving speed and/or an FF control amount is predetermined values based upon the characteristics of an electro-magnetically driven valve, it is possible that the predetermined target moving speed would turn incompatible with the characteristics of an actual valve because the actual valve has a plurality of frictional sliding portions, electromagnets, springs, etc., the conditions and characteristics of which elements can vary from those at the manufacturing thereof. Also, in actual products, some differences of performances among the products are inevitable so that a target moving speed predetermined based upon designed characteristics can be incompatible with actual characteristics of a valve. Then, it would be difficult to make an actual moving speed in conformity with its target moving speed, resulting in the increase of the deviation $\Delta V$ and consequently, the increase of an FB control amount. This, in turn, would increase the fear of occurrence of the control hunting as described above. Accordingly, in order to reduce the fear of the hunting due to FB control and to make an actual moving speed in conformity with its target value quickly, it is preferable that a target moving speed and/or an FF control amount can be corrected, compensating for aging variation of an electro-magnetically driven valve and the other conditions thereof.

Further, while a function determining (calculating) an FB control gain Gb is set out upon manufacturing or designing an electro-magnetically driven valve, it is possible that an FB control amount is insufficient to make an actual moving speed in conformity with its target moving speed because of aging variation and/or individual differences among products, as described above. Thus, it is preferable that a function and/or means for determining FB control gain Gb can be corrected appropriately after starting of use of an electro-magnetically driven valve.

Moreover, during use of an internal combustion engine, intake/exhaust valves are directly exposed to pressure variation of operational fluid in cylinders, and thus, the movements of valve bodies are subject to acceleration and deceleration forces from the operational fluid. Acceleration and deceleration forces are advanced by first order from a moving speed to be controlled, and accordingly, are not directly reflected in $-Gb \cdot \Delta V$. Thus, more appropriate speed control will be achieved if effect of pressure of operational fluid is taken into account in control of an FB control gain.

Furthermore, as already noted, in the energization control for electro-magnetically driven valves described in some of the above-listed patent publications, it has been proposed to selectively and appropriately employ different FB control gains depending upon the distance between an armature and (energized) electromagnets or deviation ($\Delta V$) between an actual moving speed and a target moving speed, rather than an always constant FB control gain. In order to avoid the control hunting and/or stepping-out of control, however, it is desirable that deviation $\Delta V$ or else is corrected quickly and gently without abrupt change of an FB control gain.

SUMMARY OF INVENTION

The objects of the present invention are to provide methods of controlling energiazation for improving the performance of an electro-magnetically driven valve operating as an intake or exhaust valve for an internal combustion engine, wherein, for increasing opening and closing speeds of the valve by increasing a control speed in the opening and closing control of the valve, there are taken into account that the importance of FB control varies dependent upon the relation between an actual moving speed and its target; and that there are the particular directional characteristics in the hunting and stepping-out limiting the gain of the FB control which consists in the whole control, as noted above; and also the effects of aging variation, etc. in the control of the electro-magnetically driven valve.

For achieving the above-mentioned object, the present invention provides a method of controlling energaization of an electro-magnetically driven valve having electromagnets and an armature which is attracted to the electromagnets and thereby moving a valve body to either of an opened position or a closed position, comprising: determining a target moving speed of the armature relative to the electromagnets dependent upon a spacing distance of the armature from the electromagnet; controlling at least a part of energization of the electro-magnetically driven valve through feedforward control so as to make an actual moving speed of the armature relative to the electromagnets in conformity with the target moving speed while controlling at least the other part of the energization through feedback control based upon a deviation of the actual moving speed from the target moving speed; in which a gain of the feedback control is changed based upon a relation between the actual moving speed and the target moving speed.

In the above-described energization control method of the electro-magnetically driven valve, the FB control gain may be smaller when a force of operational fluid that the electro-magnetically driven valve controls acts on the valve body in the same direction as the movement of the valve body than when a force of the operational fluid acts in the direction opposite to the movement of the valve body.

In the above-described energization control method of the electro-magnetically driven valve, the feedback control gain may be changed smaller when the actual moving speed is higher than the target moving speed than when the actual moving speed is lower than the target moving speed.

Further, when a final value of the actual moving speed (a resting speed) is smaller than a predetermined speed threshold, the energization amount of the electromagnets may be shifted through learning modification so as to increase the moving speed for the spacing distance. Here, the learning modification means modification of a current and future control based upon a result of an already executed control.

Furthermore, when a deviation of an actual moving speed from a target moving speed is not lower than a predetermined deviation threshold and a final speed of the movement of the armature is not lower than a predetermined speed threshold, the calculation of the FB control gain may be shifted to be increased through learning modification.

Moreover, when a deviation of an actual moving speed from a target moving speed is entirely not higher than a predetermined deviation threshold but a final speed of the movement of the armature is not lower than a predetermined speed threshold, the energization amount of the electromagnets may be shifted through learning modification so as to decrease the moving speed at least around the end of the movement.

Also, the feedback control gain may be controlled to vary continuously depending upon a deviation of an actual moving speed from a target moving speed.

In this connection, learning modification may be done in such a manner that a target moving speed of an armature is set out depending upon the spacing distance of the armature from an electromagnets; and then, the energization of an electro-magnetically driven valve is controlled so as to bring an actual moving speed of the armature relative to the electromagnets in conformity with the target moving speed, in which the setting of the target moving speed is modified through learning modification based upon a deviation of the actual moving speed from the target moving speed.

As described above, in a control of energization of an electro-magnetically driven valve including FF control, where a target moving speed of an armature relative to electromagnets is set out for a spacing distance of the armature relative to the electromagnets and the energization of the electromagnets is controlled so as to bring the actual moving speed in conformity with the target moving speed, and FB control, where the energization of the electromagnets is corrected depending upon the deviation of the actual moving speed from the target moving speed, the necessity of the FB control varies depending upon the relation between the actual moving speed and target moving speed. Accordingly, by setting the FB control gain based upon the relation between the actual moving speed and target moving speed, a more appropriate control of the moving speeds of the valve body and armature can be achieved.

In particular, as already noted, since the risk of occurrence of the stepping-out condition is higher when an actual moving speed of an armature is lower than its target moving speed ($\Delta V<0$) than when the actual moving speed is higher than its target moving speed ($\Delta V>0$), even if the absolute values of the deviations of the actual moving speed from the target moving speed in both the cases are equal to each other, it is required in the former case to increase the moving speed as quickly as possible. Thus, when the actual moving speed of the armature is lower than the target moving speed, the FB control gain will be set higher for bringing the actual moving speed close to the target moving speed, and on the other hand, when the actual moving speed is higher than the target moving speed, the FB control gain will be set smaller than that in the case that the actual moving speed of the armature is lower than the target moving speed, while avoiding the occurrence of the control hunting, and thereby it is allowed to bring the actual moving speed in conformity with the target moving speed while surely excluding the fear of the stepping-out in the opening and closing control of the electro-magnetically driven valve.

Further, as already noted, a force of intake and/or exhaust flow acting on a valve body will help the action of electromagnets attracting an armature if the force is in the same direction as the movement of the valve body, but oppose the attraction of the electromagnets for the armature if the force is in the opposite direction to the movement of the valve body. Thus, the effect of the operational fluid can be eliminated from the energization control of the electro-magnetically valve through modification of an FB control gain depending upon the difference of the force impacted on the valve body from the operational fluid, in which modification the FB control gain is set smaller when a force of an operational fluid that the electro-magnetically driven valve controls acts on the valve body in the same direction as the movement of the valve body than when the force of the operational fluid acts in the opposite direction to the movement of the valve body.

Also, the problem that characteristics of an actual electro-magnetically driven valve turn to be incompatible with predetermined FF control and/or FB control can be solved through learning modification of control amounts, namely modifying current and future operation based upon results of past operation automatically and anytime in each of products.

One of important matters to be modified through such learning modification is that, with reference to the graph of opening speed vs. lift as shown in FIG. 2, the curve of an actual movement of an armature at and around its end should not fall below the target curve (In FIG. 2, although the resting speed (at full opened position) is shown as substantially zero, the armature in practical contacts the electromagnets at a low speed within a range of inducing no damage on electromagnets). If the curve of the actual moving speed of the armature around its end falls below the target curve, the possibility that the speed becomes substantially zero before the armature reaches to the point of full opening would increase. In this case, electromagnetic force must be increased by, for instance, applying a rather high holding current instantly the speed falls down to zero; otherwise, the armature would be pulled back to an intermediate point due to the action of springs, resulting in failure in adhesion of the armature, and possibly causing the above-mentioned stepping-out condition.

Thus, as described above, through learning modification where an energization amount fed to electromagnets is shifted so as to increase a moving speed when a final value of an actual speed is smaller than a predetermined speed threshold, the final value of the actual moving speed is always maintained at or above a predetermined speed threshold, and thereby it can be avoided that the actual moving speed falls to zero before reaching the full opening point. In this case, it is enough that the predetermined speed threshold is set as small as possible and within such a range that any control errors and/or control fluctuation could not render the actual moving speed fallen down to zero erroneously.

The learning modification is also desired in a condition that an actual moving speed exceeds a target moving speed; the deviation of the actual moving speed from the target moving speed is not lower than a predetermined deviation threshold; and a final speed of the movement of the armature is also not lower than a predetermined speed threshold. It may be estimated that such a condition will occur because an energization amount fed to electromagnets for the target moving speed is too high. In such a condition, through modifying a function of calculating an FB control gain so as to increase the FB control gain; reducing the energization amount fed to the electromagnets; and modifying downwardly the actual moving speed relative to the target moving speed over the whole movement, it can be simultaneously overcome that both the problems that the actual moving speed would increase relative to the target moving speed and that the final speed of the movement of the armature is too high.

Further, the learning modification is also desired in a condition that, although a deviation of an actual moving speed from a target moving speed is entirely at or below a predetermined deviation threshold, a final speed of the movement of the armature is at or above a predetermined speed threshold. Such an operational condition means that the setting of exciting current fed to coils is deviated to the higher speed side at the end of the movement. Thus, in such a condition, through learning modification, the energization amount fed to the electromagnets is shifted downwardly so as to reduce the moving speed at least at and around the end of the movement.

Moreover, when a FB control gain is substantially continuously changed depending upon a deviation $\Delta V$, an FB control amount in the direction of canceling the deviation $\Delta V$ will continuously vary without abrupt change and gradually increase and/or decrease depending upon the deviation $\Delta V$. Accordingly, not only the deviation $\Delta V$ will disappear more quickly, compared with the case of employing a constant FB control gain, but also the fear of occurrence of the control hunting will be reduced because of absence of an abrupt change in the FB control amount, which would be seen in a case of a stepwise changed. FB control gain (in a certain case, it is possible that the sign of the FB control amount is reversed).

EXPLANATION OF PREFERRED EMBODIMENTS

Figure 2:
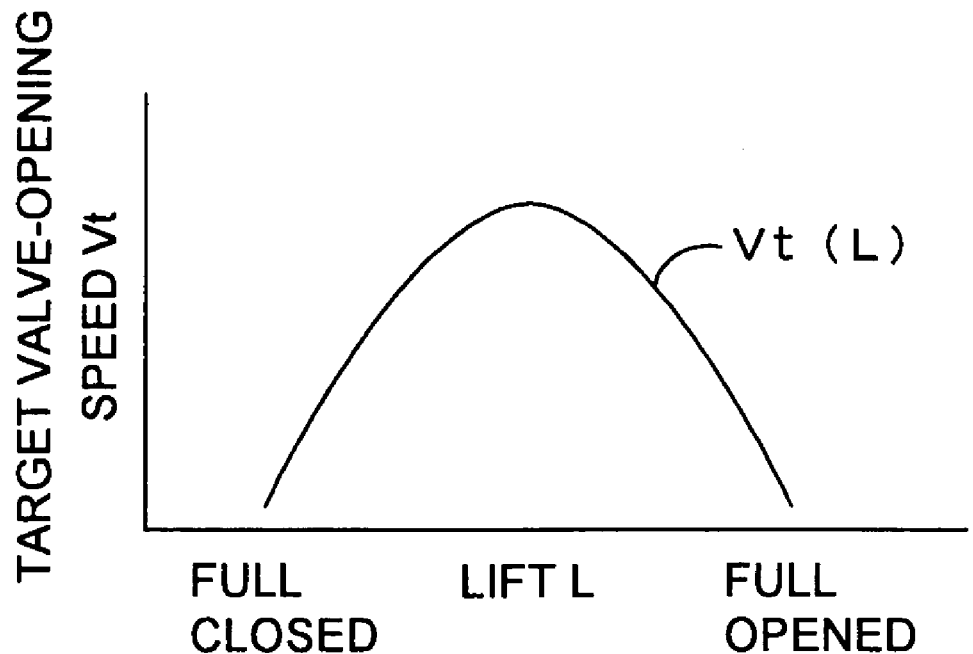
FIG. 2 is a graph showing the relation of lift vs. opening speed during opening an electro-magnetically driven valve as a preferable relation between a position and a moving speed of an armature in the valve.
Figure 4A:
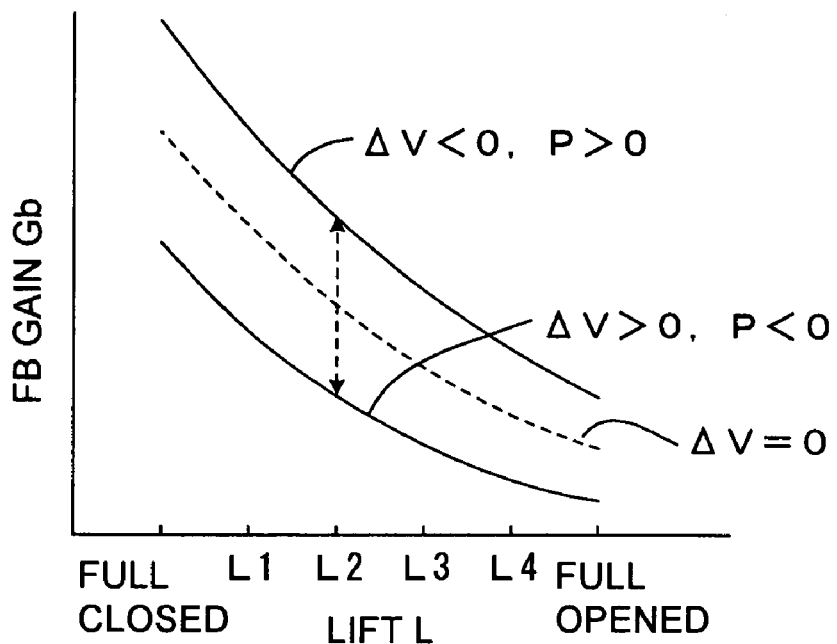
FIG. 4A is a graph showing the change of an FB control gain depending upon spacing distance (lift L) of an armature from electromagnets, where it is shown that the FB control gain is set larger in a case that an actual moving speed is smaller than a target moving speed ($\Delta V<0$) than in a case that an actual moving speed is larger than a target moving speed ($\Delta V>0$).

FIG. 4A is a graph showing an embodiment according to the present invention, in which a target moving speed is set out for lift L during opening of a valve and a FB control gain Gb is reduced with the increase of the lift L, as illustrated in FIG. 2. As already noted, together with the increase of the lift L, namely, as an armature is brought closer to electromagnets, its electromagnetic force is increased and the variation of an exciting current fed to coils more largely varies the electromagnetic force generated on the electromagnets. Accordingly, as the armature is brought closer to the electromagnets, a contribution of an FB control amount to the electromagnetic force or the moving speed of the armature is increased, and therefore, as shown in FIG. 4A, it is preferable that the FB control gain Gb is progressively reduced as the armature is brought closer to the electromagnets in order to avoid the occurrence of control hunting.

Further, as seen from this figure, the FB control gain Gb is set smaller in a case that a deviation $\Delta V$ of an actual moving speed of the armature relative to its target moving speed is positive ($\Delta V>0$) than in a case that $\Delta V$ is negative ($\Delta V<0$). In this regard, in each case of $\Delta V>0$ and $\Delta V<0$, the FB control gain may be set as a constant, such as $Gb_{(\Delta V<0)}$ and $Gb_{(\Delta V>0)}$, where $Gb_{(\Delta V<0)}>Gb_{(\Delta V>1)}$. In this case, since $\Delta V=0$ upon the switching of the FB control gain, no abrupt change of the FB control amount due to the switching of the FB control gain occurs substantially. However, for canceling the deviation $\Delta V$, the FB control gain Gb may be varied substantially continuously with the deviation $\Delta V$, in order that the deviation $\Delta V$ may disappear while preventing the abrupt change and control hunting. Accordingly, the FB control gain may be given as a function of two parameters, lift L and deviation $\Delta V$, which function decreases with the increase of the lift L (see curves in FIG. 4A and arrows in FIG. 4B) and varies depending upon the deviation $\Delta V$ (see arrows in FIG. 4A and FIG. 4B).

Moreover, in the illustrated embodiment, the FB control gain Gb may be modified depending upon a force, applied to the valve body by operational fluid controlled by the valve, in which the FB control gain is set smaller when the force acts on the valve body in the same direction as its movement (P<0) than when the force acts on the valve body in the direction opposite to its movement (P>0). In this connection, with respect to P, its magnitude in each of the opposite signs may be taken into account, and the setting curve based upon $\Delta V$ may be modified dependent upon the value of P.

Figure 1:
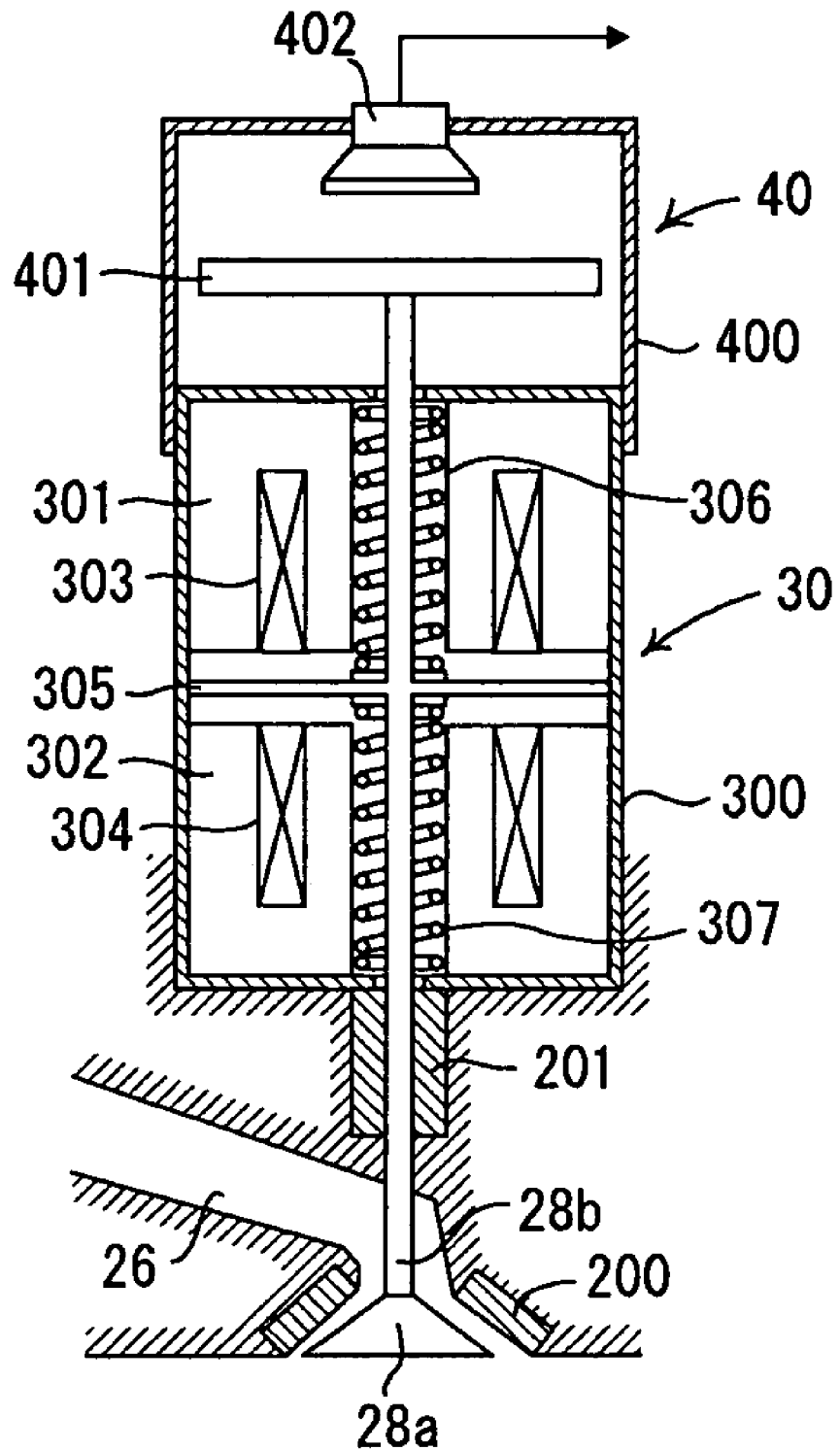
FIG. 1 schematically shows a section of an example of a structure of an electro-magnetically driven intake valve and an intake valve lift sensor mounted thereon.
Figure 5:
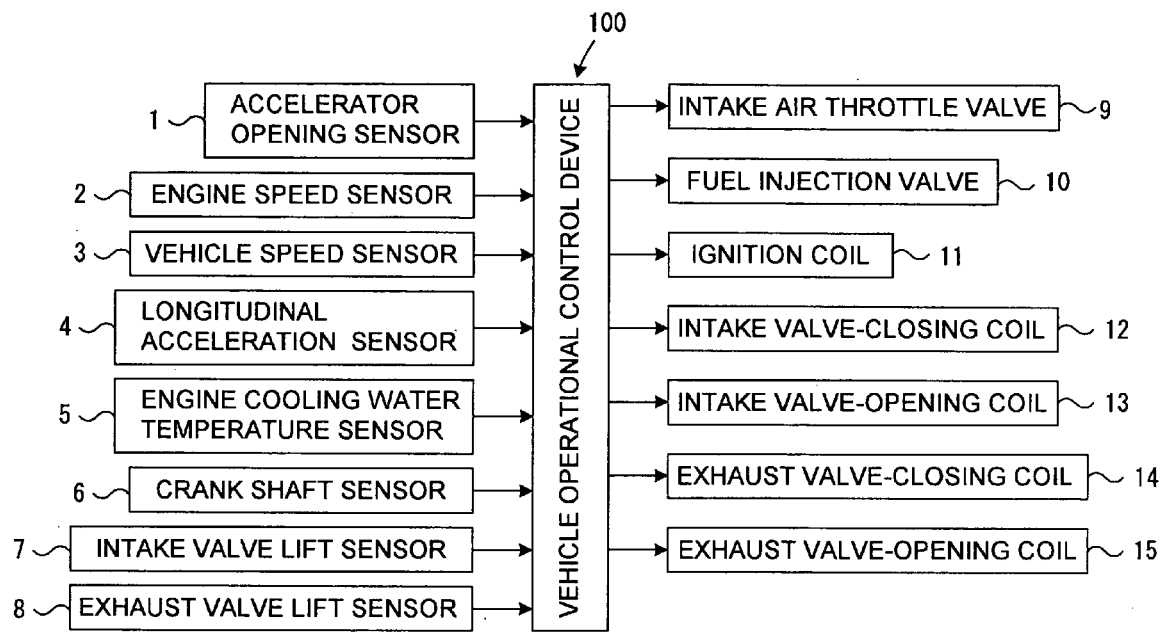
FIG. 5 is a schematic diagram of a control system for implementing energization control of an electro-magnetically driven valve in an internal combustion engine of a vehicle in accordance with the present invention, but illustrating only elements relating to the control of the present invention.

FIG. 5 is a schematic diagram of a control system for implementing energization control of an electro-magnetically driven valve in an internal combustion engine of a vehicle in accordance with the present invention, but illustrating only elements relating to the control of the present invention. In this internal combustion engine for a vehicle, a control of the operation of the engine is executed with a vehicle operational control device. In the diagram, the vehicle operational control device 100 is a control device equipped with a microcomputer, to which fed are a signal indicating an accelerator opening from an accelerator opening sensor 1 which detects the depression of an accelerator pedal by a driver; a signal indicating an engine speed from an engine speed sensor 2; a signal indicating a vehicle speed from a vehicle speed sensor 3; a signal indicating a longitudinal acceleration of the vehicle from a longitudinal acceleration sensor 4; a signal indicating a temperature condition in the engine from an engine cooling water sensor 5; a signal indicating an angular position of a crank shaft from a crank shaft angular sensor 6; a signal indicating an intake valve opening from an intake valve lift sensor 7 (designated by 40 in the example of FIG. 1); and a signal indicating an exhaust valve opening from an exhaust valve lift sensor 8. The vehicle operational control device 100 determines how to operate the engine every moment based upon the information, given from the above input signals relating to the operational conditions of the engine, and controls the operations of a throttling valve 9 provided in an intake passage of the engine; fuel injection valves 10, injecting fuel in intake air of the engine; an ignition coil 11 activating ignition plugs of the engine; coils 12 for closing the intake valve (designated by 303 in the example of FIG. 1); coils 13 for opening the intake valve (304 in FIG. 1); coils 14 for closing an exhaust valve; and coils for opening the exhaust valve.

Figure 6:
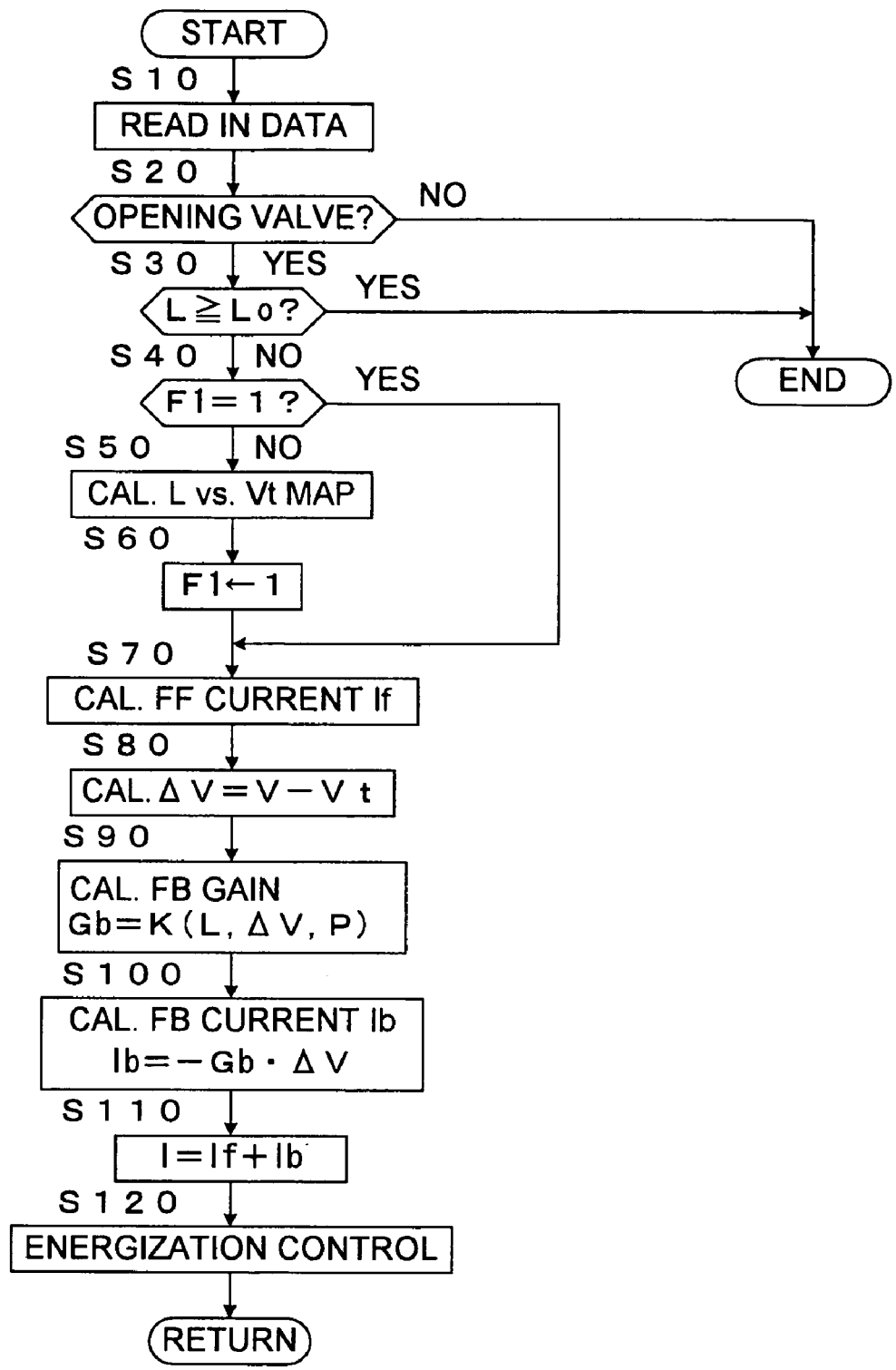
FIG. 6 shows a flowchart of an embodiment of a basic structure of energization control of an electro-magnetically driven valve according to the present invention.

In the followings, a way of executing a method of controlling energization of an electro-magnetically driven valve according to the present invention with a vehicle operational control device as shown in FIG. 5 will be more in detail explained with respect to one of its embodiments. FIG. 6 is a flowchart showing the whole control steps in the embodiment.

When control starts in response to closure of an ignition switch, not shown in the drawings, data are read-in in step 10. Then, in step 20, it is judged whether or not the valve, the object to be controlled, should be opened, based upon the read-in data. If the answer is YES, the control goes to step 30, in which it is judged whether or not lift L of the valve has reached to the full opened lift Lo. Until the valve is fully opened, the answer will be NO, and thus the control will go to step 40.

In step 40, it is judged whether or not flag F1 is 1. In this type of control, since flag F1 has been reset to 0 at the starting of the control, the answer is NO at the first time the control reaches to this step after starting of the control, and thus, the control goes to step 50, in which calculated is a map, as illustrated in FIG. 2, defining the relation of lift L vs. target valve-opening speed Vt. In this connection, the relation of lift L vs. target valve-opening speed Vt is calculated based upon a operational condition of the engine in every event of opening of an electro-magnetically driven valve, and the calculation is executed based upon the signals from the respective sensors as illustrated in FIG. 5. In this embodiment, since the judgment of flag F1 in step 40 and the setting of flag F1 to 1 in step 60 are executed, the setting of the map is executed, at the beginning, once for each of valve-opening events.

Figure 3:
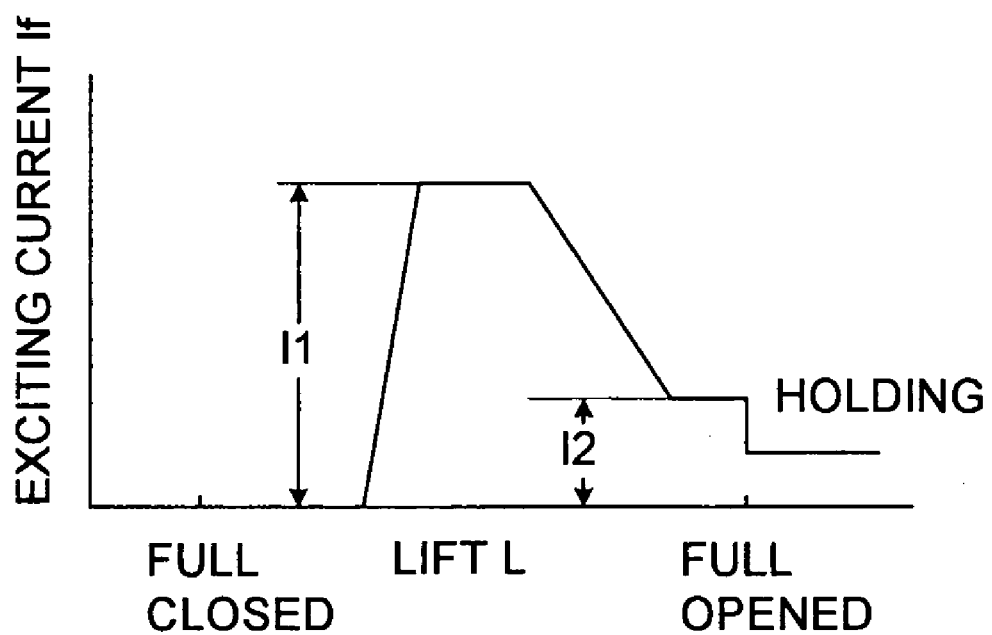
FIG. 3 is a graph showing the relation of lift vs. exciting current during opening an electro-magnetically driven valve for control of exciting current depending upon a position of an armature in the valve.

When the control reaches to step 70, current If, to be fed to the valve-opening coils as the amount of FF control in the total energiazation amount is calculated, based upon the map of lift L vs. target valve-opening speed Vt, set in the previous step and a map of lift L vs. exciting current as illustrated in FIG. 3. Then, the control goes to step 80.

In step 80, a valve-opening speed V at a moment in each flow is compared with a target valve-opening speed Vt at the corresponding moment, and the difference between them $\Delta V = V - Vt$ is calculated.

Figure 4B:
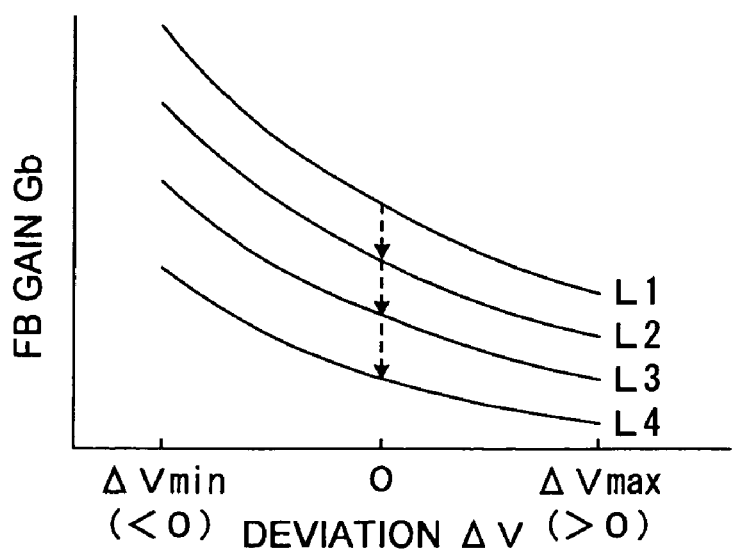
FIG. 4B is a graph showing the change of an FB control gain depending upon deviation $\Delta V$ of an actual moving speed from a target moving speed, wherein it is shown that the FB control gain is decreased as the displacement (lift) of an armature toward electromagnets increases.

Next, the control goes to step 90, in which, based upon a judgment of the relation between the direction of operational fluid flow under the control of the vehicle operational control device as illustrated in FIG. 5 and the direction of the movement of the valve body (the sign of P in FIG. 4), FB control gain Gb for this moment is calculated using a function Gb (L, $\Delta V$, P) employing the above parameters as variables. The function Gb(L, $\Delta V$, P) in the calculation of the FB control gain is formed as shown in FIG. 4A or 4B, rendering the FB control gain larger for larger distance between the armature and electromagnets attracting it (=Lo−L), and further, calculating the FB control gain which varies depending upon $\Delta V$ and P in the above-mentioned manner.

Then, in step 100, based upon the above-calculated deviation $\Delta V$ and FB control gain, current Ib, fed to the valve-opening coils as the amount of feedback control in the energization of the valve is calculated. Gb is defined as positive, so that Ib is calculated by Ib=−Gb·$\Delta V$.

In the next step 110, the energization value for the valve-opening coils is calculated by I=If+Ib. When $\Delta V>0$, i.e. the actual moving speed of the armature is larger than its target moving speed, the current component of FB control Ib reduces the exciting current fed to the coils by subtracting (the absolute value of) Gb·$\Delta V$ from the current component If of the FF control. On the other hand, when $\Delta V<0$, i.e. the actual moving speed of the armature is smaller than its target moving speed, the current component of FB control Ib adds the absolute amount of Gb·$\Delta V$ to the current component If of the FF control. As explained above, the absolute value of Gb·$\Delta V$ is larger when $\Delta V$ is negative than when $\Delta V$ is positive.

Subsequently, in step 120, current I, a sum of the current If, calculated as the current component of FF control, and the current Ib, calculated as the current component of FB control, is fed to the valve-opening coils. In this connection, in the example of the energization pattern of opening the valve based upon the FF control as illustrated in FIG. 3, when the valve is opened to about one-third of a full opened condition, the current for the coils is rapidly raised up to a high value I1, held to the value I1 for a while, and subsequently, reduced gradually to a low value I2 as the valve is rendered closer to the full opened condition, and then fallen down to a holding current when the valve is fully opened. The reason why no current is fed in the initial phase of the opening of the valve is because, in this phase, the distance between the armature and electromagnet to be energized is too long for the electromagnetic force to effectively contribute to the movement of the valve. Accordingly, in the initial phase of opening of the valve, the armature is moved toward the full opened position under only the action of the springs. In the initial phase of opening of the valve, in the same way as the FF control, the FB control does not effectively contribute to the movement of the armature, either. Thus, the FB control may be set to start after the armature moves by a certain distance (it may be before the starting of feeding exciting current of the FF control).

In accordance with the above-described manners, a higher degree of control can be achieved, in which a vibration system, consisting of the mass body including the armature, valve shaft connected thereto, valve body, etc. and springs, is rendered vibrating, and the valve is opened and closed more rapidly using electromagnets having smaller capacities, while, when the armature rests on the electromagnets in the end of the opening and/or closing event of the valve and/or when the valve body rests upon the valve seat in closing the valve, the moving speeds of the armature and valve body are brought as close to zero as possible.

Figure 7:
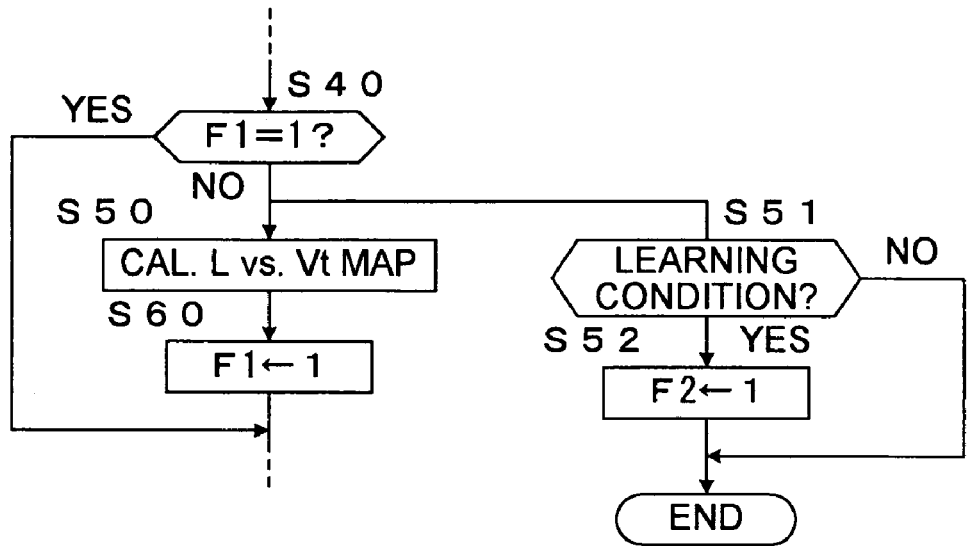
FIG. 7 shows a partial flowchart of the flowchart of FIG. 6 in a case that learning modification is incorporated in the control; the part corresponding to the modification is shown.
Figure 8:
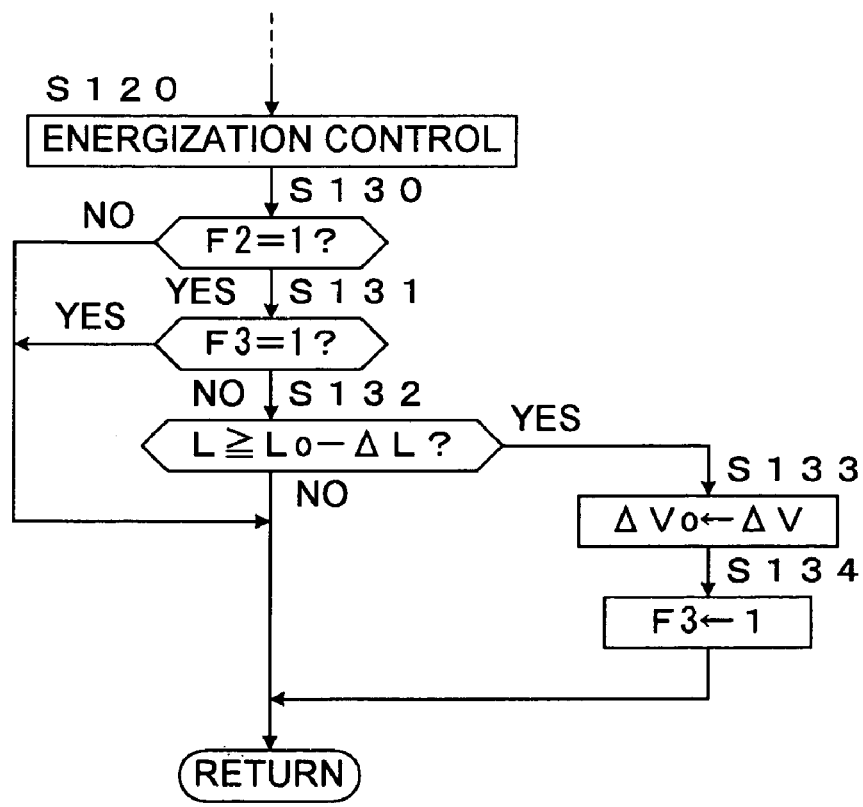
FIG. 8 shows a partial flowchart similar to that in FIG. 7.
Figure 9:
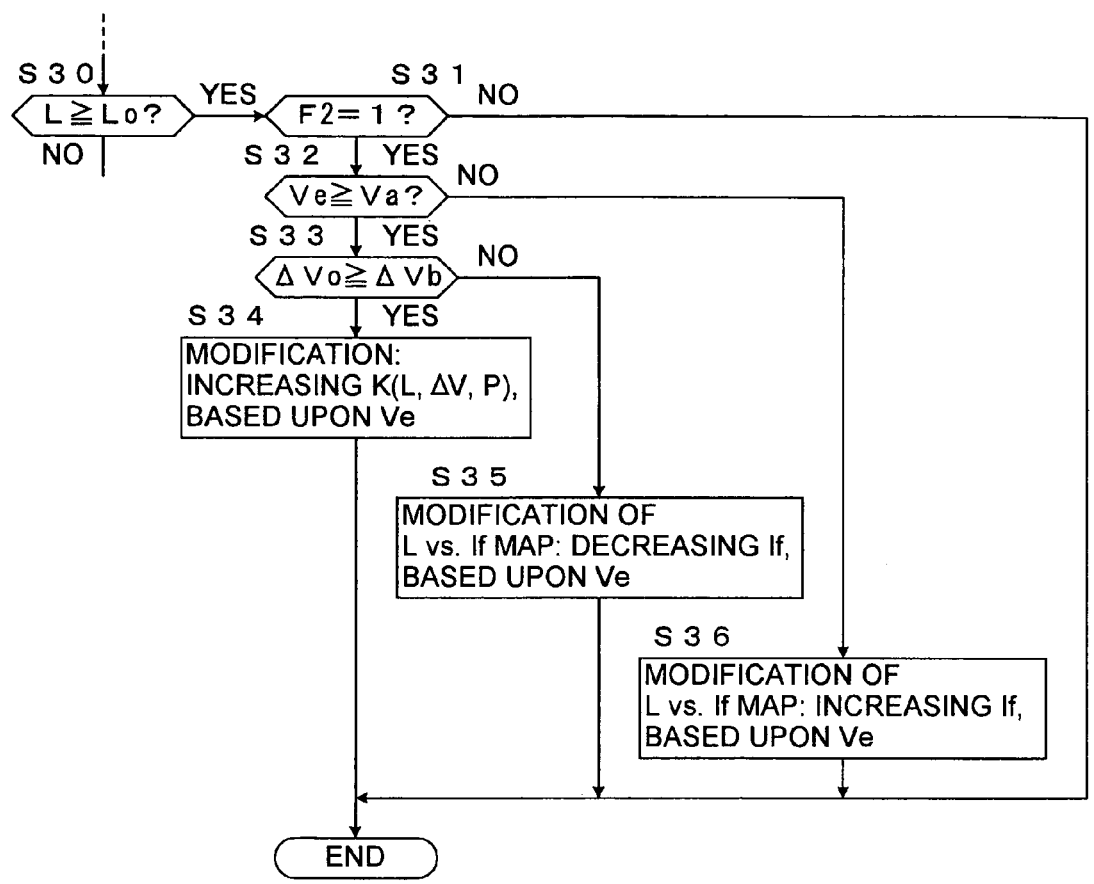
FIG. 9 shows a partial flowchart similar to that in FIG. 8.

Next, referring to FIGS. 7, 8 and 9, there is explained about an embodiment incorporating a function of learning modification as described above by modifying a part of the flowchart in FIG. 6.

For executing learning modification, first, as shown in FIG. 7, the control goes to step 51 in the way of going from step 40 to step 50, i.e. upon the staring of the valve-opening operation in this example, and it is judged whether or not a condition for learning modification is established, i.e. whether or not the engine is operated under condition where the learning modification is allowed. Conditions that the operation of the engine is not subject to the effect of the accelerator opening and the force imparted on the valve body from operational fluid is constant, such as just before stopping the engine, during fuel cut-off, upon starting of the engine, etc., may be considered as satisfying conditions for the learning modification. Then, when the answer is YES, the control goes to step 52, in which flag F2 is set to 1.

Subsequently, as shown in FIG. 8, the control goes from step 120 to step 130 before returning to step 10, in which it is judged whether or not flag F2 is set to 1, and, if the answer is YES, the control goes to step 131, in which it is judged whether or not flag F3 is set to 1. Flag F3 will be set to 1 when the control goes to step 134 as described below. Then, because the answer is NO when the control has not reached to step 131 before, the control goes to step 132, in which it is judged whether or not lift L reaches to Lo−$\Delta$L, by $\Delta$L before lift of the full opened position, Lo. The value of $\Delta$L is set to an appropriate value so as to grasp the entire deviation of the actual moving speed of the armature from its target moving speed, for example, the magnitude of 10~20% of the fill opened lift Lo. Until the answer in step 132 turns into YES, the control continues returning.

When the answer in step 132 turns into YES, the control goes to step 133, in which the current deviation $\Delta V$ of the actual moving speed of the armature from its target moving speed is memorized as $\Delta$Vo. Since, in this time, the control goes to step 134 in which flag F3 is set to 1, the control after this goes from step 131 to Return while bypassing step 132.

When the valve reaches to the full opened position because of the advance of the control according to the flowchart of FIG. 6 and the answer of step 30 becomes YES, the control goes to step 31 as shown in FIG. 9, in which it is judged whether or not flag F2 is set to 1. If the learning condition is not established, the answer is NO and the control terminates.

When F2 has been set to 1, the control goes to step 32, in which it is judged whether or not the final value Ve of the actual moving speed of the armature is at or above a predetermined speed threshold Va. When the answer is YES, the control goes to step 33, in which it is judged whether or not the deviation $\Delta$Vo memorized previously in step 133 is at or above a predetermined deviation threshold $\Delta$Vb. If the answer is YES, the control goes to step 34. When the control reaches to this step, the deviation of the actual moving speed of the armature from the target moving speed is not lower than the predetermined deviation threshold, and the final speed of the movement of the armature is not lower than the predetermined speed threshold. Then, in step 34, learning modification of the function Gb(L, $\Delta V$, P) for calculating the FB control gain is executed so as to increase the FB control gain.

When the answer in step 33 is NO, the control goes to step 35. When the control reaches to this step, the deviation of the actual moving speed of the armature from its target moving speed is entirely lower than the predetermined deviation threshold but the final speed of the movement of the armature is not lower than the predetermined speed threshold. Then, in step 35, the map of lift L vs. exciting current If (FIG. 3) is shifted through the learning modification based upon the final speed Ve of the movement of the armature so as to reduce the FF control amount and thereby decreasing the moving speed at least around the end of the movement. In this connection, in those steps, in addition to the learning modification for the FF control amount, learning modification of the map of lift L vs. target valve-opening speed Vt as shown in FIG. 2 may be executed, which will render the speed control more preciser and smoother.

When the answer in step 32 is NO, the control goes to step 36. When the control reaches to this step, the final value of the actual moving speed of the armature is lower than the predetermined speed threshold. Thus, in step 36, the map of lift L vs. exciting current is shifted through learning modification based upon the final speed Ve of the movement of the armature so as to increase the FF control amount for increasing the moving speed at least around the end of the movement. In this connection, in the same way as step 35, the learning modification may be executed for the map of lift L vs. target valve-opening speed Vt in step 36, which will render the speed control more preciser and smoother.

It will be apparent that, while FIGS. 6~9 explained above show the control in opening the valve from the closed position, the control in closing the valve from the opened position may be executed in substantially similar manners with non-substantial changes, such as replacing the judgment for opening the valve with the one for closing the valve, defining lift L as a moving distance from the full opened position to the full closed position, etc.

In the above, although the present invention is explained with respect to several embodiments, it will be apparent to implement other various embodiments within the scope of the present invention.

What is claimed is:

1. A method of controlling energaization of an electromagnetically driven valve having electromagnets and an armature which is attracted to the electromagnets and thereby moving a valve body to either of an opened position or a closed position, comprising: determining a target moving speed of the armature relative to the electromagnets dependent upon a spacing distance of the armature from the electromagnet; controlling at least a part of energization of the electro-magnetically driven valve through a feedforward control so as to make an actual moving speed of the armature relative to the electromagnets in conformity with the target moving speed while controlling at least the other part of the energization through a feedback control based upon a deviation of the actual moving speed from the target moving speed; in which a gain of the feedback control is changed based upon a relation between the actual moving speed and the target moving speed.

2. A method of controlling energaization of an electromagnetically driven valve described in claim 1, wherein the FB control gain is rendered smaller when a force of an operational fluid, controlled by the electro-magnetically driven valve, acts on the valve body in the same direction as the movement of the valve body than when a force of the operational fluid acts in the opposite direction to the movement of the valve body.

3. A method of controlling energaization of an electromagnetically driven valve described in claim 1, wherein the feedback control gain is rendered smaller when the actual moving speed is higher than the target moving speed than when the actual moving speed is lower than the target moving speed.

4. A method of controlling energaization of an electromagnetically driven valve described claim 2, wherein, when a final value of the actual moving speed is smaller than a predetermined speed threshold, the energization amount of the electromagnets is shifted through learning modification, thereby increasing the moving speed depending upon the spacing distance.

5. A method of controlling energaization of an electromagnetically driven valve described in claim 1, wherein, when a deviation of the actual moving speed from the target moving speed is not lower than a predetermined deviation threshold and a final speed of the movement of the armature is not lower than a predetermined speed threshold, the calculation of the FB control gain is shifted to be increased through learning modification.

6. A method of controlling energaization of an electromagnetically driven valve described in claim 1, wherein, when a deviation of the actual moving speed from the target moving speed is entirely not higher than a predetermined deviation threshold but a final speed of the movement of the armature is not lower than a predetermined speed threshold, the energization amount of the electromagnets is shifted through learning modification, thereby decreasing the moving speed at least around the end of the movement.

7. A method of controlling energaization of an electromagnetically driven valve described in claim 1, wherein, the feedback control gain is controlled so as to vary continuously depending upon a deviation of the actual moving speed from the target moving speed.

8. A method of controlling energaization of an electromagnetically driven valve having electromagnets and an armature which is attracted to the electromagnets and thereby moving a valve body to either of an opened position or a closed position, comprising: setting a target moving speed of the armature relative to the electromagnets dependent upon a spacing distance of the armature from the electromagnet; controlling an actual moving speed of the armature relative to the electromagnets to be rendered in conformity with the target moving speed, in which the setting of the target moving speed is modified through learning modification based upon a deviation of the actual moving speed from the target moving speed.

9. A method of controlling energaization of an electromagnetically driven valve described in claim 2, wherein the feedback control gain is rendered smaller when the actual moving speed is higher than the target moving speed than when the actual moving speed is lower than the target moving speed.

10. A method of controlling energaization of an electromagnetically driven valve described claim 2, wherein, when a final value of the actual moving speed is smaller than a predetermined speed threshold, the energization amount of the electromagnets is shifted through learning modification, thereby increasing the moving speed depending upon the spacing distance.

11. A method of controlling energaization of an electromagnetically driven valve described in claim 2, wherein, when a deviation of the actual moving speed from the target moving speed is not lower than a predetermined deviation threshold and a final speed of the movement of the armature is not lower than a predetermined speed threshold, the calculation of the FB control gain is shifted to be increased through learning modification.

12. A method of controlling energaization of an electromagnetically driven valve described in claim 2, wherein, when a deviation of the actual moving speed from the target moving speed is entirely not higher than a predetermined deviation threshold but a final speed of the movement of the armature is not lower than a predetermined speed threshold, the energization amount of the electromagnets is shifted through learning modification, thereby decreasing the moving speed at least around the end of the movement.

13. A method of controlling energaization of an electromagnetically driven valve described in claim 2, wherein, the feedback control gain is controlled so as to vary continuously depending upon a deviation of the actual moving speed from the target moving speed.

* * * * *